(12) United States Patent
Gordecki (10) Patent No.: US 7,181,257 B2
(45) Date of Patent: Feb. 20, 2007

(54) SLIDER MECHANISM FOR HANDHELD DEVICES

(75) Inventor: Ryszard J. Gordecki, Green Oaks, IL (US)

(73) Assignee: Motorola, Inc., Schaumburg, IL (US)

( * ) Notice: Subject to any disclaimer, the term of this patent is extended or adjusted under 35 U.S.C. 154(b) by 134 days.

(21) Appl. No.: 11/024,311

(22) Filed: Dec. 28, 2004

(65) Prior Publication Data

US 2006/0142073 A1 Jun. 29, 2006

(51) Int. Cl.
H04M 1/00 (2006.01)
H04B 1/08 (2006.01)
H04B 1/38 (2006.01)

(52) U.S. Cl. ............... 455/575.4; 455/90.3; 455/575.1; 455/347; 379/433.12

(58) Field of Classification Search .. 455/575.3–575.4, 455/550.1, 575.1, 557, 566, 553.1, 556.2, 455/90.3, 95, 128, 347–348; 379/330, 447, 379/428.01, 428.02, 433.12; 220/532–541, 220/543–544, 549–551, 546
See application file for complete search history.

(56) References Cited

U.S. PATENT DOCUMENTS

| | | | | |
|---|---|---|---|---|
| 6,822,871 B2* | 11/2004 | Lee et al. | .................... | 361/727 |
| 7,003,104 B2* | 2/2006 | Lee | .................... | 379/433.13 |
| 2003/0064688 A1 | 4/2003 | Mizuta et al. | | |
| 2004/0053649 A1* | 3/2004 | Sun | .................... | 455/575.1 |
| 2004/0085739 A1 | 5/2004 | Lee et al. | | |
| 2004/0198246 A1* | 10/2004 | Tsai | .................... | 455/90.1 |
| 2004/0198477 A1 | 10/2004 | Jung et al. | | |
| 2004/0229664 A1* | 11/2004 | Chadha | .................... | 455/575.1 |
| 2005/0054397 A1* | 3/2005 | Kim et al. | ............... | 455/575.4 |
| 2005/0064921 A1* | 3/2005 | Jeong et al. | ............. | 455/575.4 |
| 2005/0095995 A1* | 5/2005 | Bae | .................... | 455/90.3 |
| 2005/0113154 A1* | 5/2005 | Park et al. | ............... | 455/575.4 |
| 2005/0245251 A1* | 11/2005 | Lee et al. | ................ | 455/422.1 |
| 2006/0135221 A1* | 6/2006 | Lim | .................... | 455/575.1 |

* cited by examiner

Primary Examiner—Meless Zewdu
(74) Attorney, Agent, or Firm—Charles W. Bethards (57) ABSTRACT

A slider mechanism (414) includes a first element (516), a second element (518) and a biasing device (590). The second element (518) slides with respect to the first element (516) along a path. The biasing device (590) functions as an over-center mechanism, such that external force is required to move the slider mechanism (414) for an initial range of its travel, and stored energy is used to move the slider mechanism (414) along a subsequent range of its travel. The biasing device (590) includes a pair of springs (524, 522) that are under compression. The springs (524, 522) are accommodated in openings (530, 532, 534) formed in the first and second elements (516, 518) and the springs (524, 522) move in a plane of the mechanism (414) to reduce the thickness of the slider mechanism (414).

20 Claims, 5 Drawing Sheets

SLIDER MECHANISM FOR HANDHELD DEVICES

FIELD OF THE INVENTION

This invention relates in general to slider mechanisms and, in particular, slider mechanisms that permit components of electronic devices to be retracted when not in use.

BACKGROUND OF THE INVENTION

Handheld device are continually being miniaturized and improved to meet consumer size, aesthetic, and performance requirements. Slider mechanisms permit parts of such devices, such as displays or keypads, to be retracted and hidden when not in use. Slider mechanisms can facilitate miniaturization and offer additional freedom to device designers. However, current sliding mechanisms are complex, bulky, heavy, and expensive. Current sliding mechanisms add significantly to the weight of the devices in which they are incorporated. Further, current sliding mechanisms are relatively thick, making it difficult to incorporate them into aesthetically-pleasing designs.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

In overview, the present disclosure concerns slider mechanisms for components such as those on portable electronic devices including, for example, laptop computers, portable video players, handheld computers, wireless messaging devices, portable game players, GPS mapping devices, pagers, portable dictionaries, personal digital assistants, cellular telephones, and equivalents and combinations thereof.

As further discussed below various inventive principles and combinations thereof are advantageously employed to provide a slider mechanism for permitting a component to be moved relative to another component in an electronic device while substantially hiding the apparatus that permits such movement, thus alleviating various problems associated with known mechanisms, provided these principles or equivalents thereof are employed.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, upper and lower and the like are used solely to distinguish one from another entity or action without necessarily requiring or implying any actual such relationship or order between such entities or actions.

The terms "a" or "an" as used herein are defined as one or more than one. The term "plurality" as used herein is defined as two or more than two. The term "another" as used herein is defined as at least a second or more. The terms "including," "having" and "has" as used herein are defined as comprising (i.e., open language). The term "coupled" as used herein is defined as connected, although not necessarily directly.

Figure 1:
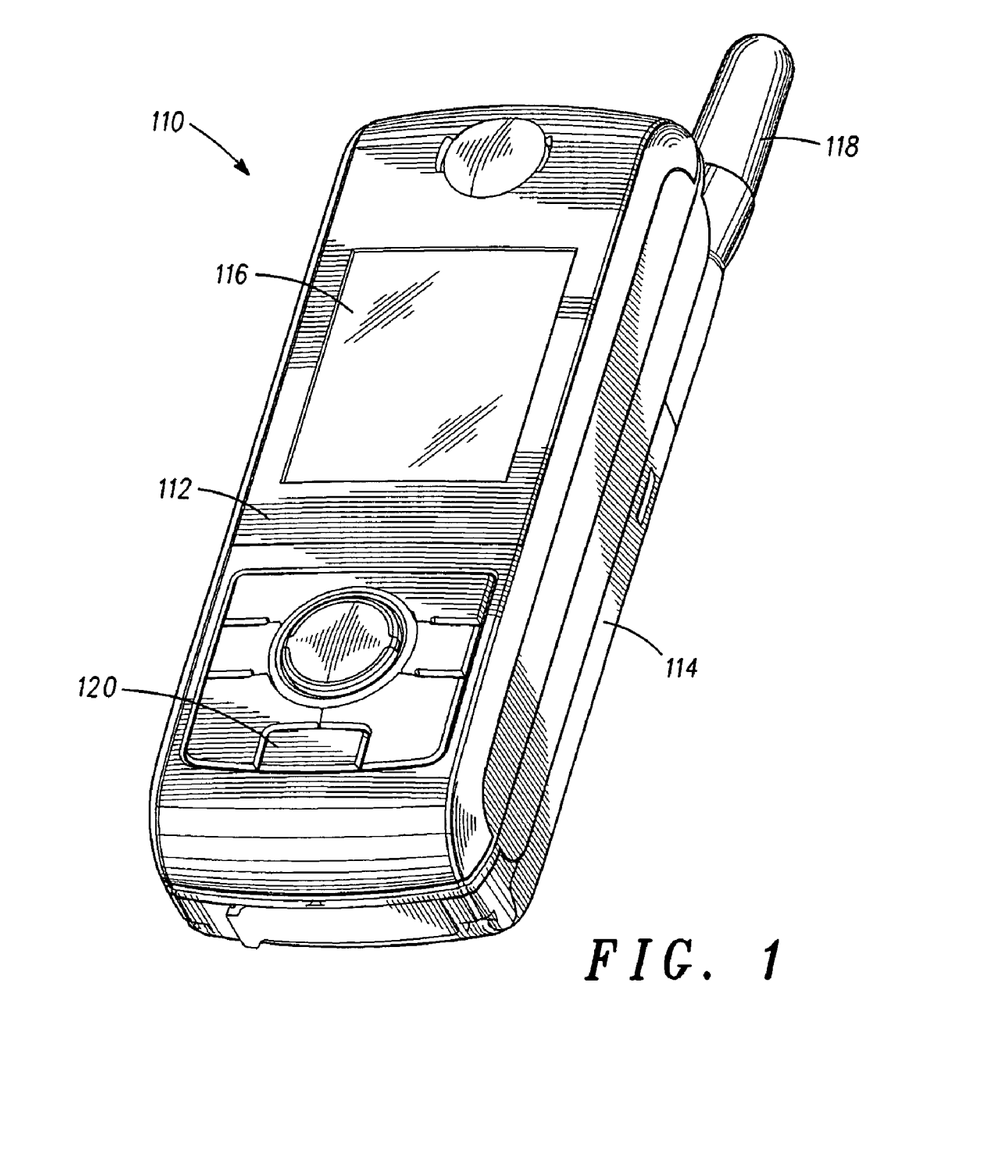
FIG. 1 is a perspective view of an exemplary device that incorporates the slider mechanism of the present invention.
Figure 2:
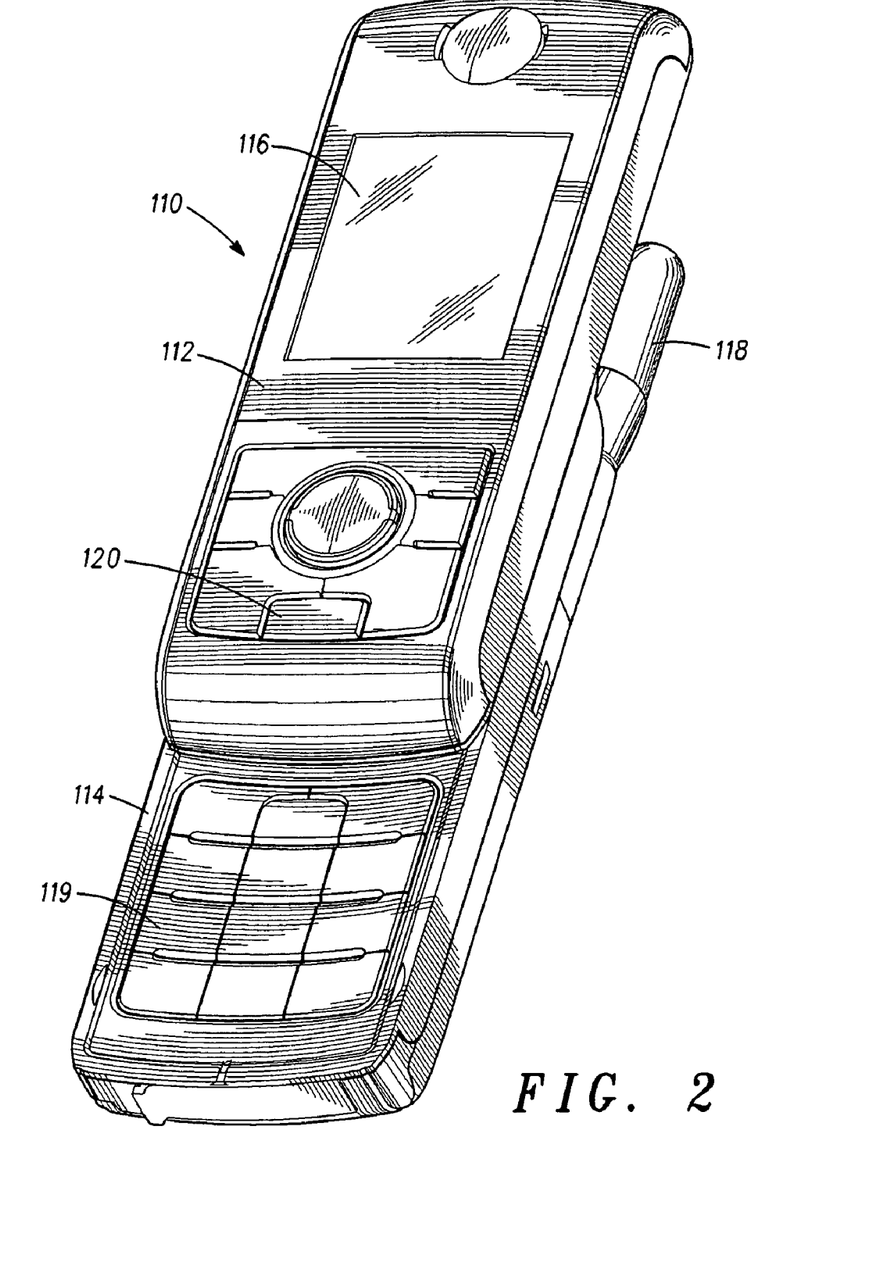
FIG. 2 is a perspective view in which two components of the device of FIG. 1 are separated with the slider mechanism.
Figure 3:
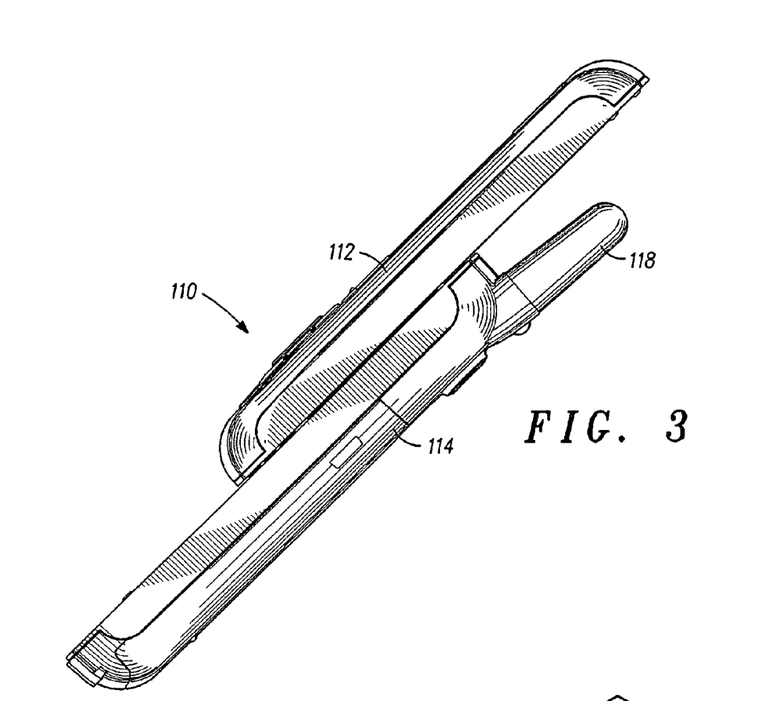
FIG. 3 is a side view of the device of FIG. 2.

Basically, as shown in FIGS. 1–3, a device 110, which may be a mobile telephone in this case, includes an upper component 112 and a lower component 114. The upper component 112 includes a display 116 and various buttons 120. The lower component 114 includes an antenna 118 and a keypad 119 as shown. The upper component 112 slides with respect to the lower component 114 to expose the keypad 119. A user can apply manual force in the longitudinal direction of the device 110 to cause the lower component 114 to slide with respect to the upper component thus causing the keypad 119 to extend from the position shown in FIG. 1 or to retract from the position shown in FIG. 2. A mechanism that permits such sliding motion is described in detail below.

Figure 4:
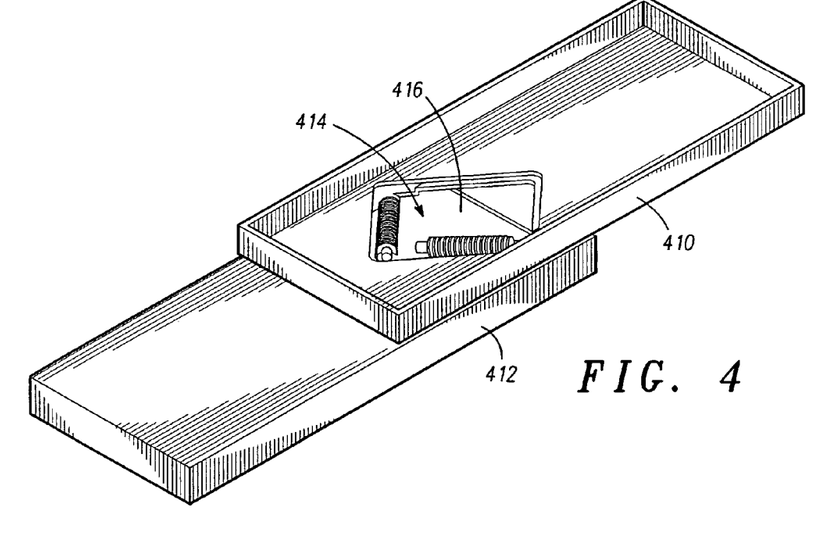
FIG. 4 is a diagrammatic perspective view of a pair of housing members that are coupled to one another with an exemplary slider mechanism of the present invention.

FIG. 4 shows an upper housing member 410, which can corresponds to the upper component 112 of FIGS. 1–3, and a lower housing member 412, which can correspond to the lower component 114 of FIGS. 1–3. A slider mechanism 414 is located between the upper housing member 410 and the lower housing member 412 to effect sliding motion along a linear path. Thus, part of the lower housing member 412 can be retracted or extended according to the position of the slider mechanism 414.

Although the embodiment of FIGS. 1–3 shows that a display 116 is located on the upper component 112 and is always exposed, a display 116 may be located on the lower housing member 412, such that the display 116 is hidden or partially hidden when the lower housing member 412 is retracted. This and other alternative arrangements are readily apparent to those skilled in the art in view of the present discussion. The upper and lower housing members 410, 412 of FIG. 4 can be parts of any device, e.g., portable electronic device, having movable components and are not necessarily parts of the mobile telephone illustrated in FIGS. 1–3. For example, the lower housing member 412 can be a lower component of a personal digital assistant or a wireless messaging device.

Figure 5:
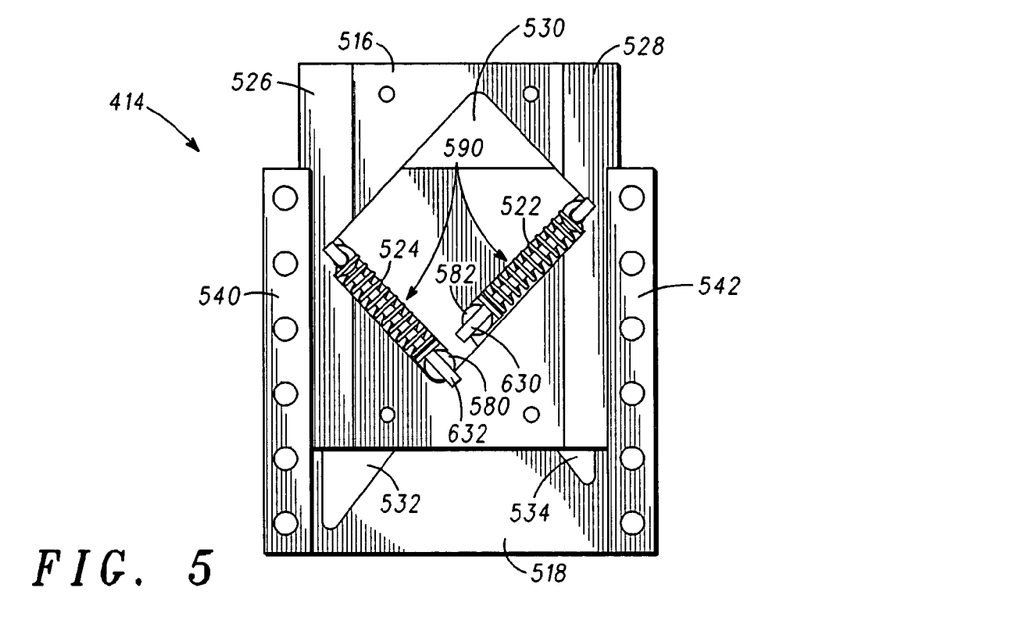
FIG. 5 is a perspective view of the slider mechanism of FIG. 4 in an extended position.

FIGS. 5–8 show details of the slider mechanism 414. Referring to FIG. 5, the slider mechanism 414 includes a first element 516, which is a generally planar, rectangular part and can be made of sheet metal. The first element 516 includes a large central opening 530, which can be generally diamond-shaped. On one side of the first element 516 is a first rail 526. A second rail 528 is opposite to and parallel to the first rail 526. The upper component 112 of FIGS. 1–3 or the upper housing member 410 of FIG. 4 can be fixed to the first element 516, for example. Several holes (unnumbered) are provided in the first element 516 for permitting a component to be fastened to the first element 516.

A second element 518 faces the first element 516 and slides with respect to the first element 516 along a linear path. The second element 518 is generally planar and rectangular and can be made of sheet metal. In the illustrated embodiment, a first generally-triangular opening 532 is formed in one side of the second element 518, and a second generally-triangular opening 534 is formed in the opposite side of the second element 518. A first guide 540 is fixed to one side of the second element 518, and a second guide 542 is fixed to the opposite side of the second element 518. The guides 540, 542 are discussed in more detail below. The lower component 114 of FIGS. 1–3 or the lower housing member 412 of FIG. 4 can be fastened to the second element 518, for example. Therefore, in this embodiment, FIG. 5 corresponds to the position of the device 110 shown in FIG. 2, in which the keypad is exposed.

Figure 6:
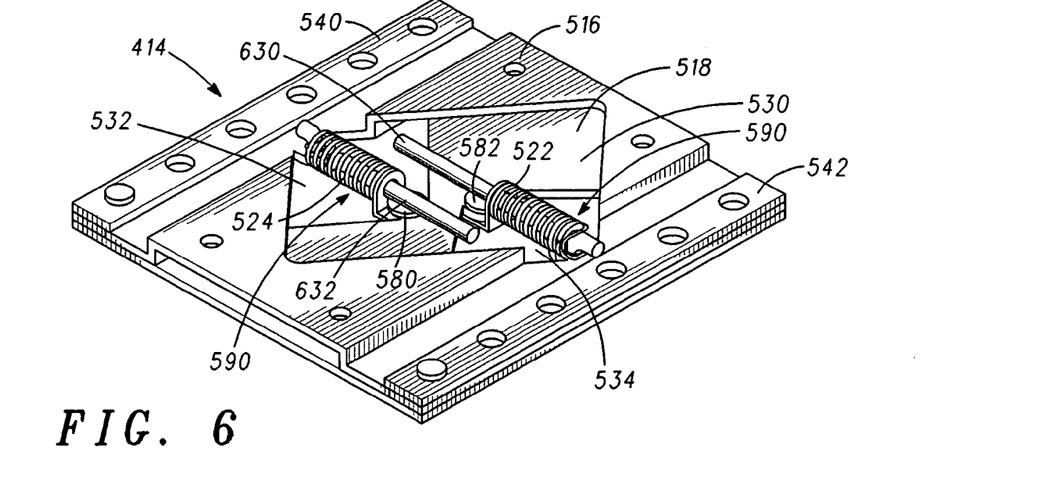
FIG. 6 is a perspective view of the slider mechanism of FIG. 5 in a neutral, or center, position.
Figure 7:
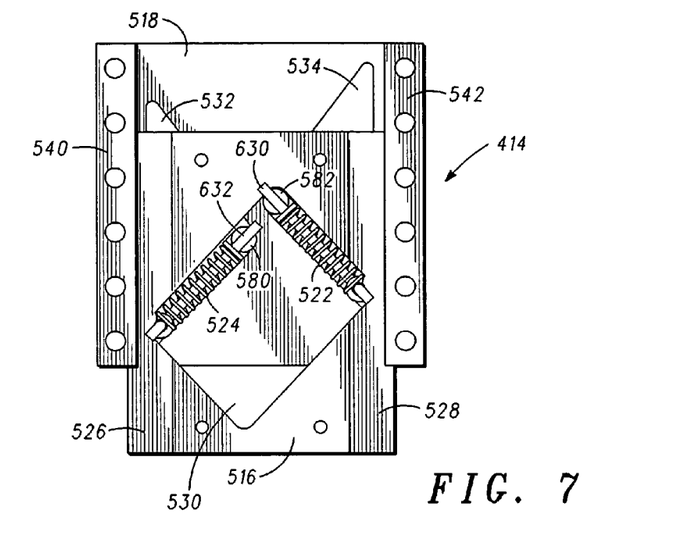
FIG. 7 is a perspective view of the slider mechanism of FIGS. 5 and 6 in a retracted position.

A biasing device 590 is coupled to the first element 516 and the second element 518 to apply an urging force to the first and second elements 516, 518 so that the slider mechanism 414 has the operating characteristics of an over-center mechanism. The biasing device 590 includes a first compression spring 524 and a second compression spring 522. Outer ends, or first ends, of the compression springs 524, 522 are pivotally coupled to and apply force to the first element 516. Inner ends, or second ends, of the compression springs 524, 522 are pivotally coupled to and apply force to the second element 518. The springs 524, 522 are asymmetrically arranged, for a reason that is explained below. In particular, the springs 524, 522 are asymmetrically arranged about a plane that includes a longitudinal axis of the slider mechanism 414, as shown in FIGS. 5–7. In other words, the springs 524, 522 are asymmetrically arranged about a plane that is perpendicular to and bisects the second element 518.

As shown in FIG. 6, first and second retainer devices 632, 630 can be employed to prevent the springs 524, 522 from buckling, or deforming in a direction perpendicular to their axes. In the illustrated embodiment, the first retainer device 632 is a metal rod fitted coaxially within the first compression spring 524, and the second retainer device 630 is a metal rod, as shown, fitted coaxially within the second compression spring 522. However, other retainer devices may be employed to prevent buckling of the springs 524, 522. For example, a metal sleeve or a cage may be fitted coaxially around a portion of the exterior of each spring 524, 522 to prevent buckling.

Figure 8:
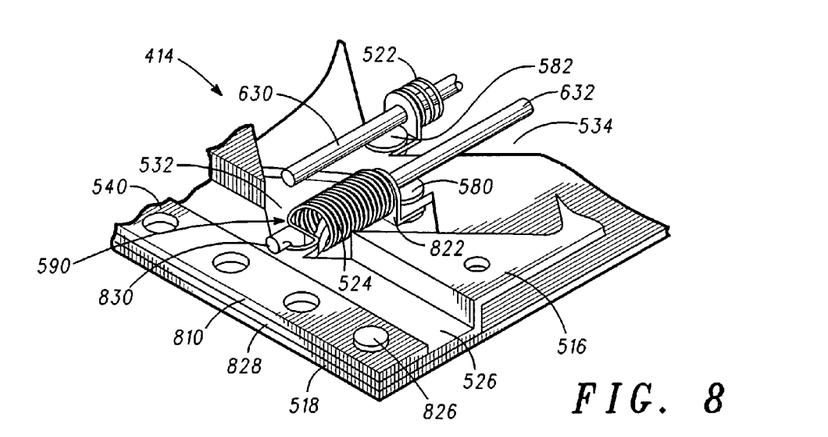
FIG. 8 is a detailed perspective view of a portion of the slider mechanism of FIGS. 5–7.

As shown in the illustrated embodiment, the retainer devices 632, 630 not only can prevent buckling of the corresponding springs, 524, 522 but they can serve in coupling the ends of the springs 524, 522 to the first and second elements 516, 518. FIG. 8 shows in detail the coupling of the first spring 524 and the first retainer device 632 to the first and second elements 516, 518. In the slider mechanism 414 of the illustrated embodiment, both of the springs 524, 522 are coupled to the first and second elements 516, 518 in the same manner.

As shown in FIG. 8, the outer end of the first spring 524 includes a loop that is engaged with a hook 830. The hook 830 is formed by the outer end of the rod of the retainer device 632, which is bent to suit this purpose as shown. The hook 830 is fitted loosely into a hole formed in a lug of the first element 516, as shown. The rod of the retainer device 632 and the spring 524 are free to pivot about the first element 516. That is, the outer ends of the springs 524, 522 can pivot with respect to the first element 516 about an axis that is perpendicular to the plane of the first element 516.

The inner end of the first spring 524 engages with a bracket 822. As shown in FIG. 8, the bracket 822 is L-shaped and is pivotally fastened to the second element 518 with a rivet 580, for example. The rivet 580 of the illustrated embodiment permits the bracket 822 to pivot about the axis of the rivet 580 in a manner that is known in the art of fasteners. Thus, the rivet 580 defines a pivot axis that is perpendicular to the plane of the second element 518. The bracket 822 includes an opening through which the rod 632 of the retainer device 526 can freely pass. As the first element 516 moves with respect to the second element 518 and as the length of the spring 524 changes, the distance between the bracket 822 and the hook 830 changes accordingly. Other known pivotal couplings can be used to attach the first and second springs 524, 522 to the first and second elements 516, 518 as would be apparent to those skilled in the art.

The first guide 540 is fixed to the second element 518, for guiding the second element 518 and for limiting movement of second element 518 with respect to the first element 516 to the linear path. The second guide 542 is fixed to the opposite side of the second element 518 and is parallel to the first guide 540. The two guides 540, 542 are mirror images of one another and serve the same purpose. The guides 540, 542 are spaced apart from one another by approximately the width of the first element 516 and define a plane in which the second element 518 moves with respect to the first element 516. The guides 540, 542 retain the rails 526, 528 as described in detail below.

In the illustrated embodiment, the first guide 540, which is illustrated in detail in FIG. 8, is formed by stacking a spacer plate 828, which can be metal, and a cover plate 810, which can also be metal, on the edge of the second element 518. Rivets 826, for example, can be used to fasten the cover plate 810 and the spacer plate 828 to the second element 518 such that the spacer plate 828 and the cover plate 810 cannot move with respect to the second element 518. Other fasteners can be used as well instead of the illustrated rivets 826.

In the embodiment illustrated in FIG. 8, the width of the cover plate 810 is greater than that of the spacer plate 828. Thus, the cover plate 810 overlaps the first element 516 and forms a channel to accommodate and retain the first rail 526. Also, the thickness of the spacer plate 828 is greater than that of the first element 516, to provide adequate clearance between the cover plate 810 and the second element 518 for the first rail 526 to permit sliding motion between the rails 526, 528 and the guides 540, 542. Thus, the rails 526, 528 can freely move within the channels formed by the guides 540, 542. However, the first element 516 cannot separate from the second element 518 in a direction perpendicular to the path defined by the guides 540, 542. Other types of guides can be used as well, as one of ordinary skill in the art will recognize. For example, the sides of the second element 518 can be bent one hundred and eighty degrees along a margin to form similar guides along the sides of the second element 518.

The parts that make sliding contact in the slider mechanism 414 can be coated to reduce friction in a manner known to those of ordinary skill in the art. For example, Teflon or a coating made of zinc and Teflon can be applied to at least the rails and the guides to reduce the amount of friction between sliding surfaces.

The springs 524, 522 are arranged in a V-shaped pattern and move in a planar fashion when the second element 518 slides with respect to the first element 516. That is, the axes of the springs 524, 522 lie in a plane that is parallel to the plane defined by the guides 540, 542. Thus, although the springs 524, 522 have a wide range of movement, they do not add significantly to the thickness of the slider mechanism 414. Also, the springs 524, 522 are accommodated within the openings 530, 532, 534 formed in the first and second elements 516, 518. Therefore, the springs 524, 522 are free to move without interference with the first and second elements 516, 518, and the thickness of the slider mechanism 414 is limited, which makes it nearly invisible when located between two components 112, 114 of a portable electronic device 110. The openings 530, 532, 534 not only allow the springs 524, 522 to move without interference but they reduce the weight of the slider mechanism 414.

As shown in FIG. 4 an opening 416 can be formed in the upper housing member 410. The opening 416 can also accommodate the springs 524, 522 which allows the slider mechanism 414 to be further hidden from view, which contributes to the aesthetic appearance of the device in which the slider mechanism 414 is employed. In other words, the opening 416 permits the upper housing member 410 to be closer to the lower housing member 412.

The slider mechanism 414 includes stops for halting the travel of the second element 518 with respect to the first element 516. A first stop is formed by the rivet 580 and a corresponding corner of the opening 530. As shown in FIG. 5, when the second element 518 slides with respect to the first element 516 in a first direction to a first stable position, which is illustrated in FIG. 5, the rivet 580 engages with the first element 516 at a corner of the opening 530 to stop further movement of the second element 518 in that direction. Likewise, as shown in FIG. 7, when the second element 518 slides with respect to the first element 516 in a second direction to a second stable position, a rivet 582, which is located at the inner end of the second spring 522, engages with the first element 516 at a corner of the opening 530 to stop further movement in that direction. Therefore, the slider mechanism 414 has two stable positions defined by the stops. Other forms of stops can be used as well, as one of ordinary skill in the art would recognize. Also, the rivets 580, 582 need not engage with the first element 516 at the corner of the opening 530. Other points of engagement may be used as well, depending on the desired stopping positions.

The springs 524, 522 change position according to the position of the second element 518 with respect to the first element 516 such that the biasing device 590 has at least three modes of operation. In a first mode, the springs 524, 522 urge the second element 518 in the first direction of the path toward the first position, which is shown in FIG. 5. In a second mode, the springs 524, 522 urge the second element 518 in a second direction of the path toward the second position. Which is shown in FIG. 7. The first direction is opposite to the second direction. In a neutral mode, the forces of the springs 524, 522 are applied to the first and second elements 516, 518 in a direction that is transverse to the guides 540, 542. That is, in the neutral mode illustrated in FIG. 6, the second element 518 is in a neutral position with respect to the first element 516. Therefore, in the position illustrated in FIG. 6, the second element 518 is in equilibrium and does not move with respect to the first element 516 until additional force such as a manual force applied by a user is applied to move the slider mechanism 414 out of the neutral position.

Therefore, the first mode corresponds to a first range of positions of the second element 518 with respect to the first element 516. The first range of positions is the range between the position shown in FIG. 5 and the neutral position. The second mode corresponds to a second range of positions of the second element 518 with respect to the first element 516. The second range is the range between the position shown in FIG. 7 and the neutral position.

In the first range of positions, in order to change the position of the slider mechanism 414, the user of a device 110 that incorporates the slider mechanism 414 must apply a small force to one of the components 112, 114 to overcome the force of the biasing mechanism 590 and to move the second element 518 toward the neutral position. Once the second element 518 is moved beyond the neutral position, the biasing mechanism 590 uses stored energy to move the second element 518 to the second position.

Thus, in the embodiment of FIGS. 1–3, the upper component 112 can be fixed to the first element 516 and the lower component 114 can be fixed to the second element 518. To cause the keypad to retract to a hidden position from the position of FIGS. 2 and 3, the user must apply a small force to either the upper component 112 or the lower component 114 in the longitudinal direction of the telephone 110 to cause the lower component 114 to retract. However, the user needs to apply force only when the slider mechanism 414 is in the first range of motion and in the neutral position. Once the second element 518 moves beyond the neutral position, the lower component 114 will retract under the force of the biasing mechanism 590.

Similarly, to extend the lower component 114 from the position of FIG. 1, a user must apply a small force to either the lower component 114 or the upper component 112 such that the components 112, 114 are separated longitudinally. Once the second element 518 moves beyond the neutral position, the lower component 114 will retract under the force of the biasing mechanism 590.

The ranges of motion can be adjusted by adjusting the positions of the springs 524, 522. For example, if the designer of a telephone or other device wants a component to travel for a greater distance under the force of the biasing device 590 when moving in one direction as compared to the opposite direction, the springs 524, 522 can be positioned so that the neutral position is not in the center of the range of movement of the slider mechanism 414. That is, as one of ordinary skill in the art would recognize, if the neutral position is in the center of the range of motion of the slider mechanism 414, then the travel distance of the mechanism in which external force is required will be the same as the travel distance in which no external force is required.

The springs 524, 522 are asymmetrically arranged, as mentioned above. That is, the springs 524, 522 are offset from one another in the longitudinal direction, or the direction of travel, of the slider mechanism 414. This prevents interference between the rods of the retainer devices 632, 630. That is, as shown in FIG. 6, the retainer devices 632, 630 would interfere if the axis of the springs 524, 522 were aligned in this position. Therefore, the springs 524, 522 are parallel to one another and spaced apart in the neutral mode, as shown. The positions of the springs 524, 522 can be varied as long as the retainer devices 632, 630 and the springs 524, 522 do not interfere when moving, as well understood by those of ordinary skill in the art.

The apparatus and methods discussed above and the inventive principles thereof are intended to and will alleviate problems with conventional slider mechanisms. It is expected that one of ordinary skill given the above described principles, concepts and examples will be able to implement other alternative procedures and constructions that offer the same benefits. It is anticipated that the claims below cover many such other examples. For example, although it was indicated that the first element 516 corresponds to the upper component 112 of the mobile telephone 110, either of the first and second elements 516, 518 can be fixed to the lower component 114. Furthermore, although FIG. 4 shows that an opening 416 is formed in the upper housing member 410, an additional or alternative opening can be formed in the lower housing member to accommodate the slider mechanism 414.

The disclosure is intended to explain how to fashion and use various embodiments in accordance with the invention rather than to limit the true, intended and fair scope and spirit thereof. The forgoing description is not intended to be exhaustive or to limit the invention to the precise form disclosed. Modifications or variations are possible in light of the above teachings. The embodiments were chosen and described to illustrate the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A sliding mechanism that permits relative motion along a path, wherein the sliding mechanism comprises:
    a first element;
    a second element, wherein the second element faces the first element and slides with respect to the first element along the path;
    a guide, which is fixed to one of the first and second elements, for limiting movement of the second element with respect to the first element to the path;
    a biasing device, wherein the biasing device has a first end and a second end, wherein the first end is pivotally coupled to the first element, and the second end is pivotally coupled to the second element, and wherein the biasing device changes position according to the position of the second element with respect to the first element on the path such that the biasing device has the following modes:
        a first mode, in which the biasing device urges the second element in a first direction of the path toward a first position;
        a second mode, in which the biasing device urges the second element in a second direction of the path toward a second position, wherein the first direction is opposite to the second direction; and
        a neutral mode, in which the force of the biasing device is applied to the second element in a direction that is transverse to the path.

2. The sliding mechanism of claim 1, wherein the guide defines a plane, and an axis of the biasing device lies in the plane.

3. The sliding mechanism of claim 1, wherein the guide is formed by a pair of opposed channels.

4. The sliding mechanism of claim 1, wherein the biasing device is a coil spring under compression.

5. The sliding mechanism of claim 4, wherein the first end of the coil spring is pivotally coupled to the first element, and the second end of the coil spring is pivotally coupled to the second element.

6. The sliding mechanism of claim 4, wherein the spring includes a retaining device for preventing the spring from buckling.

7. The sliding mechanism of claim 6, wherein the retaining device is a rod that is fitted inside the spring.

8. The sliding mechanism of claim 4, wherein the biasing device is a first spring that, along with a second spring, forms a pair of springs that perform the same function, wherein the first end of the first spring is an outer end of the first spring, and the second end of the first spring is an inner end of the first spring, and wherein the second spring has an outer end coupled to the first element and an inner end coupled to the second element.

9. The sliding mechanism of claim 8, wherein the springs are asymmetrically arranged on the mechanism.

10. The sliding mechanism of claim 8, wherein the springs are parallel to one another and spaced apart in the neutral mode.

11. The sliding mechanism of claim 8, wherein the second ends of the springs are spaced apart from one another in the direction of the path.

12. The sliding mechanism of claim 1, wherein the mechanism couples a first component and a second component of a communication device to one another, and the first component is fixed to the first element, and the second component is fixed to the second element.

13. The sliding mechanism of claim 12, wherein the communication device is a mobile telephone, and the second component includes a keypad, and the keypad is exposed when the second element is in the first position.

14. The sliding mechanism of claim 1, wherein the first element and the second element are generally planar.

15. The sliding mechanism of claim 14, wherein each of the first element and the second element is made of sheet metal.

16. The sliding mechanism of claim 1, wherein openings are formed in the first and second elements, and the biasing device occupies the openings.

17. A sliding mechanism for permitting relative motion of a second element with respect to a first element between a first position and a second position, the sliding mechanism comprising:
    the first element;
    the second element, wherein the second element is adjacent to the first element;
    a guide that is fixed to one of the first and second elements, wherein the guide limits relative movement of the second element with respect to the first element to a predetermined path;
    a compression spring that has the following modes:
        a first mode, in which the compression spring applies an urging force to the second element to urge the second element in a first direction of the path toward the first position;
        a second mode, in which the compression spring applies an urging force to the second element to urge the second element along the path in a second direction toward the second position, wherein the first direction is opposite to the second direction; and a neutral mode, in which the force of the compression spring is applied to the second element in a direction that is transverse to the path;

wherein, a first range of positions of the second element with respect to the first element along the path corresponds to the first mode, a second range of positions of the second element with respect to the first element corresponds to the second mode, and a neutral position of the second element with respect to the first element corresponds to the neutral mode, and the neutral position is between the first and the second ranges of positions, wherein openings are formed in the first and second elements to accommodate the compression spring.

18. The sliding mechanism of claim 17, wherein the compression spring is a first spring that, along with a second spring, forms a pair of springs that perform the same function.

19. The sliding mechanism of claim 18, wherein the openings that are formed in the first and second elements accommodate the pair of springs.

20. The sliding mechanism of claim 18, wherein the springs are pivotally coupled to the mechanism and the springs move in a planar fashion when the second element moves with respect to the first element.

* * * * *